US005751356A

United States Patent [19]

Suzuki

[11] Patent Number: 5,751,356
[45] Date of Patent: May 12, 1998

[54] VIDEO/AUDIO SIGNAL CODING SYSTEM AND METHOD

[75] Inventor: Hiroshi Suzuki, Musashino, Japan

[73] Assignee: Nippon Steel Corporation, Tokyo, Japan

[21] Appl. No.: 689,268

[22] Filed: Aug. 6, 1996

[30] Foreign Application Priority Data

Aug. 15, 1995 [JP] Japan ..................... 7-229704

[51] Int. Cl.⁶ ............... H04N 7/12; H04N 11/02; H04N 11/04
[52] U.S. Cl. ........................ 348/390; 348/423
[58] Field of Search .................. 348/390, 423, 348/409, 9, 12; 370/537, 538; H04N 7/12, 11/02, 11/04

[56] References Cited

U.S. PATENT DOCUMENTS

| 5,122,875 | 6/1992 | Raychaudhuri et al. | 348/423 |
| 5,168,356 | 12/1992 | Acampora et al. | 348/409 |
| 5,515,107 | 5/1996 | Chiang et al. | 348/473 |
| 5,583,562 | 12/1996 | Birch et al. | 348/12 |
| 5,600,366 | 2/1997 | Schulman | 348/9 |

FOREIGN PATENT DOCUMENTS 8051623 2/1996 Japan.

Primary Examiner—Tommy P. Chin
Assistant Examiner—Nhon T. Diep
Attorney, Agent, or Firm—Law Offices Pollock, Vande Sande & Priddy

[57] ABSTRACT

A video/audio signal coding system which includes a video encoder for encoding a video signal into video data and attaching encoding information to the video data as a video header to create encoded video data, an audio encoder for encoding an audio signal into encoded audio data, a multiplexer for multiplexing and outputting the video and audio data, and a controller for controlling the multiplexer, and wherein the video encoder informs the controller of the video header and data indicative of a quantity of the encoded video data corresponding to one picture, the controller judges a break in the picture of the encoded video data input to the multiplexer, and the multiplexer multiplexes the encoded audio and video data on the basis of the judgement result of the controller, and a method implemented in the video/audio signal coding system.

9 Claims, 2 Drawing Sheets

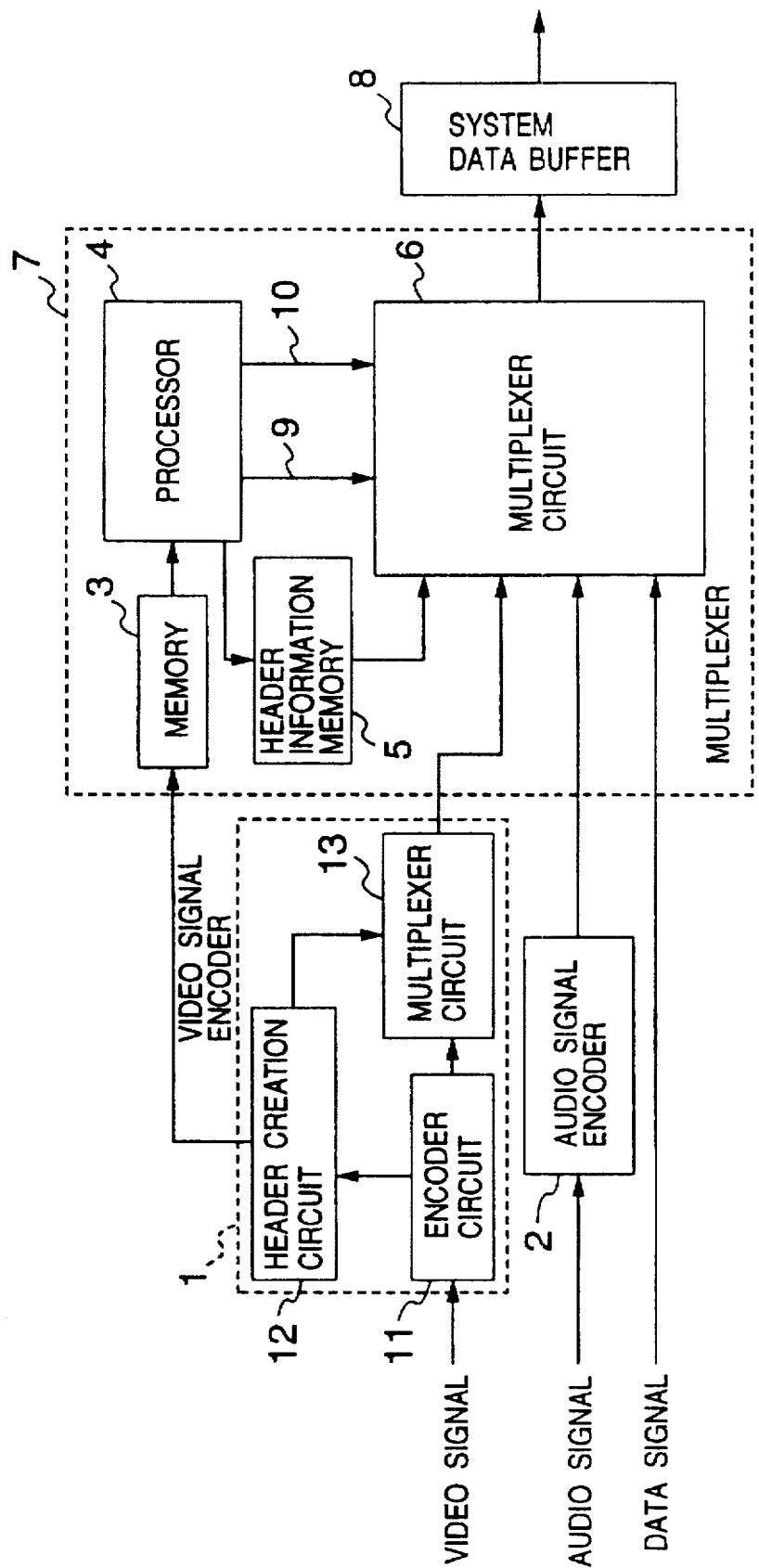

VIDEO/AUDIO SIGNAL CODING SYSTEM AND METHOD

BACKGROUND OF THE INVENTION

1. Field of the Invention

The present invention relates to a video/audio signal coding system and method which performs multiplexing operations on video and audio data to transmit these video and audio data at the same time or to record the data in a recording medium, and which is suitable, in particular, for processing motion picture and audio data compressed based by a data compression technique known as moving picture experts group (MPEG).

2. Description of the Related Art

Conventionally, there are various known techniques of coding a moving picture signal with a high efficiency. The know techniques include, for example, intra-picture coding for removal of spatial redundancy of video data, predictive coding and bidirectionally predictive coding for removal of time redundancy (redundancy in a time aspect) of moving picture data. One of the highly-efficient codings utilizing these techniques is specified as the MPEG standard (ISO/IEC 11172-2).

The MPEG standard uses forward predictive coding to remove time redundancies between a picture and a previous picture and uses bidirectionally predictive coding to remove time redundancies between a picture and pictures immediately precedent and subsequent thereto. In this connection, pictures subjected to the intra-picture coding are called "I pictures", pictures subjected to the predictive coding are "P pictures", and pictures subjected to the bidirectionally predictive coding are "B pictures".

Also employed in the MPEG standard is a unit of a collection of a plurality of pictures known as group of pictures (GOP) as shown in FIG. 3. This is for providing accessing entry points to realize random access. The GOP structure may be configured arbitrarily with use of the I, P and B pictures, but it is common to place the I picture at the head of the GOP structure, followed by the P pictures at constant intervals (e.g., of 3 pictures) with the B pictures periodically inserted therebetween. The length of the GOP structure may also be varied arbitrarily, but the length is usually set to be about 15 to 30 pictures.

There are currently two types of MPEG standards, that is, MPEG1 and MPEG2, the former having mainly a limited transmission rate of about 1.5 Mbps, while the latter is used for realizing a current level of television quality with a transmission rate of about 5–10 Mbps.

A prior art video/audio signal coding system based on the MPEG standard will be explained next. When the prior art video/audio signal coding system performs its multiplexing operation, detection of video header information in video data as a processing reference is carried out in a software-based manner. This is done as follows.

First, as shown in FIG. 2A, a processor reads all the video data and compares a pattern of the video data with a reference header pattern to thereby detect a header pattern contained in the video data. The processor then analyzes data following the header pattern to read the contents of the video header information.

Subsequently, the processor analyzes data following the video header information, creates system header information, performs multiplexing operations on the respective data, and then outputs multiplexed MPEG system data.

In other words, in the prior art multiplexing operation, the processor directly reads the video, audio and data signals received in a multiplexer, adds the system header information thereto, and then outputs the MPEG system data.

However, the quantity of video data corresponding to one display screen is increased as the coding rate increases, as in the MPEG2. The increase in the data quantity causes an increase in the quantity of data of header information to be detected, which means that the time necessary for detecting the header information is undesirably increased.

Similarly, as the coding rate increases, the quantity of data to be processed in the multiplexing operation is also increased. In more detail, the multiplexing operation is roughly divided into the following parts: (a) reading of data, (b) detecting of the video header information, (c) creating the system header information, and (d) outputting of the MPEG system data. Among these operations, the operations (a), (b) and (d) increase in processing time as the coding rate increases.

SUMMARY OF THE INVENTION

It is therefore an object of the present invention to provide a video/audio signal coding system and method which can solve the above problems in the prior art and can perform its multiplexing operation on video and audio data while reducing the a load imposed on a processor.

In order to attain the above object, in accordance with an aspect of the present invention, there is provided a video/audio signal coding system which comprises video encoding means for encoding a video signal into video data, attaching encoding information to the video data as a video header to create encoded video data, and outputting data number information indicative of the number of the encoded video data corresponding to a predetermined video unit. The encoding information includes information indicative of a head of the encoded video data corresponding to the predetermined video unit; audio encoding means for encoding an audio signal into audio data and outputting the audio data as encoded audio data; multiplexing means for multiplexing and outputting the encoded video data and the encoded audio data; and control means for receiving the video header and the data number information from the video encoding means and, on the basis of the video header and the data number information, judging a boundary corresponding to the predetermined video unit of the encoded video data input to the multiplexing means to thereby control multiplexing operation of the multiplexing means.

With such an arrangement, the video encoding means encodes the video signal and attaches and outputs information on attributes of the video data to the encoded video data as the video header. Further, the video encoding means, upon creating the video header, finds information on the number of the encoded video data, e.g., bit length, and outputs its result to the control means for controlling the multiplexing operation.

The control means, on the basis of the video header and the data number information received from the video encoding means, judges a boundary in the encoded video data input from the video encoding means to the multiplexing means, e.g., a break in the picture; whereas, the multiplexing means, on the basis of the judgement result of the control means, multiplexes the encoded video and audio data.

In the present invention, in particular, the video header information is input directly from the video encoding means for creating the video header information, so that, during the multiplexing operation at a high encoding rate, the need for extracting the video header information from a bit stream, which would impose a heavy load on the processor in the prior art, can be eliminated, thus reducing the load of the processor.

In accordance with another aspect of the present invention, there is provided a video/audio signal coding method which comprises the steps of encoding a video signal into video data, attaching encoding information to the video data as a video header to create encoded video data, and outputting data number information indicative of the number of the encoded video data corresponding to a predetermined video unit, the encoding information including information indicative of a head of the encoded video data corresponding to the predetermined video unit; encoding an audio signal into audio data and outputting the audio data as encoded audio data; and on the basis of the video header and the data number information, judging a boundary corresponding to the predetermined video unit of the encoded video data to thereby multiplex and output the encoded video data and the encoded audio data.

BRIEF DESCRIPTION OF THE DRAWINGS

FIG. 1 is a block diagram of an entire arrangement of a video/audio signal coding system according to an embodiment of the present invention;

DESCRIPTION OF THE PREFERRED EMBODIMENTS

Figure 2A:
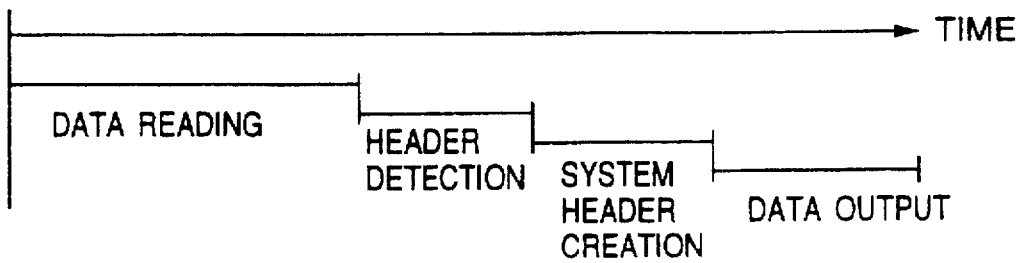
FIGS. 2A and 2B show timing charts for comparing a time necessary for signal processing in a prior art video/audio signal coding system with a time necessary for signal processing in a video/audio signal coding system according to the present invention.

An embodiment of the present invention will be explained with reference to the accompanying drawings.

Referring first to FIG. 1, there is shown an arrangement of a video/audio signal coding system according to an embodiment based on an MPEG system. As shown in FIG. 1, the illustrated video/audio signal coding system of the present embodiment comprises a video signal encoder 1; an audio signal encoder 2; a multiplexer 7 having a memory 3 for storing therein information on the information quantity of encoded data of one picture and on operational modes, a processor 4, a header information memory 5 and a multiplexer circuit 6; and a system data buffer 8.

The video signal encoder 1, which constitutes a means for encoding a video signal, includes an encoder circuit 11, a header creation circuit 12 and a multiplexer circuit 13.

The encoder circuit 11 creates encoded video data from a received video signal on the basis of an encoding rule such as an MPEG1 or MPEG2 standard.

Meanwhile, the header creation circuit 12 creates header information based on attributes, or the like, of video data encoded by the encoder circuit 11. The multiplexer circuit 13 performs its multiplexing operation over the above header and encoded video data and then outputs its result.

Figure 3:
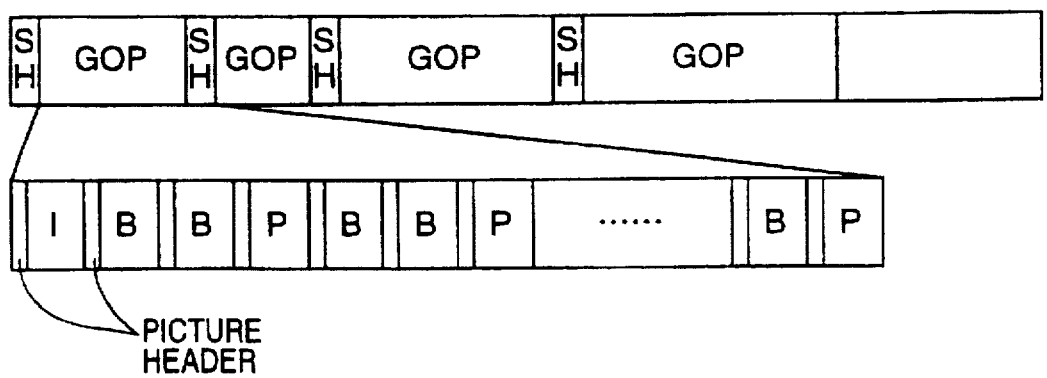
FIG. 3 is a diagram for conceptionally explaining a structure of data compressed based on an MPEG2 standard.

Shown in FIG. 3 is an example of a bit stream of the encoded video data based on the MPEG2 standard. In the drawing, a sequence header SH is attached to each video data called "group of picture" (GOP).

The sequence header SH contains information on picture size, picture aspect ratio, video display periods, etc. The video data GOP contains data of I, B and P pictures arranged in a predetermined order. A picture header with information about an encoding mode is attached to each of the I, B and P pictures.

In more detail, the video signal input to the video signal encoder 1 is encoded by the encoder circuit 11 to create video data of the I, B and P pictures. In this connection, a GOP header for defining characteristics of the pictures within the associated video data of the GOP is attached to the video data of the GOP, and a picture header indicative of information about an encoding mode within each picture is attached to the picture.

The header creation circuit 12 creates the GOP headers, sequence headers and picture headers, based on the data encoded by the encoder circuit 11. The multiplexer circuit 13 attaches the GOP, sequence and picture headers to the GOP and respective picture data to create an encoded bit stream based on the MPEG2 standard. The multiplexer circuit 13 then transmits the thus-created MPEG2-based bit stream to the multiplexer circuit 6.

The header creation circuit 12 also determines a length of the bit stream, e.g., between the picture headers, that is, a bit length L. The bit length L is stored in the memory 3, together with the sequence headers SH, GOP headers and picture headers, which will be referred to as the video information, hereinafter.

Meanwhile, an audio signal input to the audio signal encoder 2 is compressed thereby according to the MPEG standard. The compressed video and audio data, as well as a data signal such as text information input to an interface such as RS232C, are input to the multiplexer 7 to be integrated and create a single train or stream of data. Although a single video channel, a single audio channel and a single data signal channel have been used in the present embodiment, a plurality of such channels may be employed to implement an arrangement similar to the above.

Since the multiplexing operation of the multiplexer circuit 6 is carried out with use of the video data as a data reference, it is necessary to recognize two pieces of information on the video data, that is, (1) bit length corresponding to one picture and (2) operational mode associated with the video signal encoding (when there occurred a mode change during the operation).

These pieces of video information are recognized through the internal operation of the video signal encoder 1. The prior art method for analyzing the video data to recognize this information at the multiplexer 7 had a bad system efficiency. In the present embodiment, in order to avoid such a bad efficiency, the memory 3 is used to inform the multiplexer 7 of the video information.

More specifically, the processor 4, provided within the multiplexer 7, reads out the video information from the memory 3 and creates the system header information necessary for making a layered system structure. The video information stored in the memory 3 includes header information on the sequence headers SH, GOP headers and picture headers included in the video bit stream of the video signal encoder 1, as well as information on the bit length L of the stream corresponding to one picture and on the encoding rate. The processor 4, on the basis of the video information, determines the multiplexing order of the video and audio data and creates the system header information.

An explanation will next be made in connection with a transport stream (TS) as one of systems defined by the MPEG2 standard.

The processor 4, on the basis of the bit length L of the stream corresponding to one video picture, monitors transition in the buffer quantity of a video system target decoder (STD) and determines what information is to be inserted in a packet to be transmitted next. For example, the processor 4 determines the presence or absence of an inserted adaptation field, the presence or absence of an inserted program association table (PAT) or program map table (PMT) and selects the video data, audio data and private data, or selects null packets. The processor 4 sets a program ID (PID) corresponding to the selected data and creates the system header. The processor 4 writes the created system header in the header information memory 5.

The processor 4, after writing the system header information in the header information memory 5, informs the multiplexer circuit 6 of information on packet formation to cause the multiplexer circuit 6 to start its multiplexing operation.

The information on the packet formation is used to control, from the system header information, video data, audio data and private data, and which signal is multiplexed in what order on what byte basis. The processor 4 informs the multiplexer circuit 6 of this information in the form of a data select signal 9 and a data byte number signal 10.

An explanation will next be made as to the multiplexing operation of the multiplexer circuit 6 in connection with the case where the TS video data is selected.

A TS packet consists of 188 bytes, 4 bytes of which are used for a TS packet header. The remaining 184 (=188−4) bytes are usually used for the video data. The processor 4 sets the data select signal 9 and data byte number signal 10 to be sent to the multiplexer circuit 6 in such a manner that the multiplexer circuit 6 first reads out 4 bytes of the header information from the header information memory 5 and then 184 bytes of the video data therefrom.

When the data at the end of the packetized elementary stream (PES) video packet consists of less than 184 bytes, e.g., 160 bytes, an adaptation field of 24 bytes is inserted. This adaptation field is calculated by the processor and written into the header information memory 5 subsequent to the TS packet header. In this case, the processor 4 sets the data select signal 9 and data byte number signal 10 such that 28 bytes are first read out from the header information memory 5 and then 160 bytes of the video data are read out therefrom.

Figure 2B:
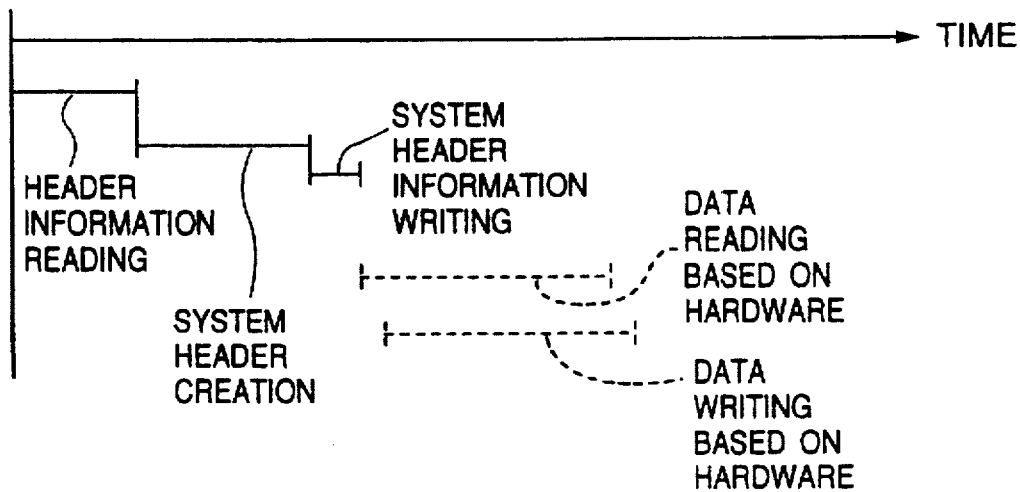

After carrying out the above setting, the processor 4 starts the multiplexer circuit 6. The multiplexer circuit 6, on the basis of the setting, outputs a read signal to read out 4 bytes of the header information from the header information memory 5 and then 184 bytes of the video data or 28 bytes of the header information from the header information memory 5 and then 160 bytes of the video data sequentially. The read-out data are subjected to a time-division multiplexing operation to create a single data train. The multiplexer circuit 6, concurrently with the reading operation with a time lag of several clocks, generates a data write signal to the system data buffer 8 to write the data train subjected to the time-division multiplexing operation into the system data buffer 8. FIG. 2B shows a timing chart for explaining the signal processing of the video/audio signal coding system according to the foregoing embodiment. When compared with a timing chart for the signal processing of a prior art in FIG. 2A, it will be seen that the time necessary for processing, such as data reading, can be made short. In FIG. 2B, since reading of the header information, creating of the system header and writing of the system header information are carried out on a software basis while data reading and data writing are carried out on a hardware basis, the hardware processing of one picture can be effected concurrently with the software processing of the next picture.

Though the processor 4 has to create the header information in the present embodiment, the multiplexer circuit 6 can eliminate the need for searching the bit stream for header information on the video data, such as the sequence header SH, GOP header and picture header, which results in the present embodiment can carrying out its processing operation at a high speed. Accordingly, the processing time of the video/audio signal coding system can be made to be about 1/2.5 of that of the prior art system.

In accordance with the video/audio signal coding system of the present invention, the system encodes video data, attaches, as a header, such information as attributes of the video data to the encoded video data and outputs it and, upon creating the header, finds the bit length of the encoded video data, judges a break in the display screen of the encoded video data on the basis of the header and the bit length of the video data, and multiplexes the encoded video data and encoded audio data on the basis of the judgement result, whereby the system can perform its multiplexing operation over the audio and video signals while reducing the burden of the processor.

What is claimed is:

1. A video/audio signal coding system comprising:

video encoding means for encoding a video signal into video data, attaching encoding information to said video data to generate encoded video data, and generating data number information indicative of a number of the encoded video data corresponding to a predetermined video data unit, said encoding information including header information indicative of a head of said encoded video data corresponding to the predetermined video data unit;

audio encoding means for encoding an audio signal into audio data to generate encoded audio data;

a first memory for temporarily storing at least the header information and the data number information generated by said video encoding means;

system header generating means for generating system headers on the basis of the header information and the data number information stored in said first memory;

a second memory for temporarily storing the system headers generated by said system header generating means;

multiplexing means for multiplexing the encoded video data generated by said video encoding means, the encoded audio data generated by said audio encoding means and the system headers stored in said second memory; and control means for judging a boundary corresponding to said predetermined video data unit in the encoded video data input from said video encoding means to said multiplexing means on the basis of the header information and the data number information stored in said first memory to thereby control multiplexing operation of said multiplexing means.

2. A video/audio signal coding system as set forth in claim 1, wherein said predetermined video data unit corresponds to one picture.

3. A video/audio signal coding system as set forth in claim 1, wherein said video encoding means and said audio encoding means respectively encode the video signal and the audio signal according to one of MPEG (moving picture experts group) 1 standard ISO/IEC 11172-2 and MPEG 2 standard ISO/IEC 13818-2.

4. A video/audio signal coding method comprising the steps of:

encoding a video signal into video data, attaching encoding information to said video data to generate encoded video data, and generating data number information indicative of a number of the encoded video data corresponding to a predetermined video data unit, said encoding information including header information indicative of a head of said encoded video data corresponding to the predetermined video data unit;

encoding an audio signal into audio data to generate encoded audio data;

temporarily storing at least the header information and the data number information;

generating system headers on the basis of the stored header information and data number information, and temporarily storing the system headers; and judging a boundary corresponding to said predetermined video data unit in the encoded video data on the basis of the stored header information and data number information to thereby multiplex the encoded video data, the encoded audio data and the stored system headers.

5. A video/audio signal coding method as set forth in claim 4, wherein said predetermined video data unit corresponds to one picture.

6. A video/audio signal coding method as set forth in claim 4, wherein said video signal encoding step and said audio signal encoding step respectively encode said video signal and said audio signal according to one of MPEG (moving picture experts group) 1 standard ISO/IEC 11172-2 and MPEG 2 standard ISO/IEC 13818-2.

7. A video/audio signal coding system comprising:

video encoding means for encoding a video signal into video data, attaching encoding information to said video data to generate encoded video data, and generating data number information indicative of a number of the encoded video data corresponding to a predetermined video data unit, said encoding information including header information indicative of a head of said encoded video data corresponding to the predetermined video data unit;

audio encoding means for encoding an audio signal into audio data to generate encoded audio data;

a first control means for temporarily storing at least the header information and the data number information generated by said video encoding means, generating system headers on the basis of the header information and the data number information, and temporarily storing the system headers;

multiplexing means for multiplexing the encoded video data generated by said video encoding means, the encoded audio data generated by said audio encoding means and the system headers stored in said first control means; and second control means for judging a boundary corresponding to said predetermined video data unit in the encoded video data input from said video encoding means to said multiplexing means on the basis of the header information and the data number information stored in said first control means to thereby control multiplexing operation of said multiplexing means.

8. A video/audio signal coding system as set forth in claim 7, wherein said predetermined video data unit corresponds to one picture.

9. A video/audio signal coding system as set forth in claim 7, wherein said video encoding means and said audio encoding means respectively encode the video signal and the audio signal according to one of MPEG (moving picture experts group) 1 standard ISO/IEC 11172-2 and MPEG 2 standard ISO/IEC 13818-2.

* * * * *